(12) United States Patent
Coyne et al.

(10) Patent No.: US 8,025,175 B2
(45) Date of Patent: Sep. 27, 2011

(54) METHOD AND APPARATUS FOR ATTACHING A HANDLE USING SELF PIERCING RIVETS

(75) Inventors: Kurt Coyne, Butler, IN (US); Alfred Alexander Arlic, II, Roanoke, IN (US)

(73) Assignee: The Vollrath Company, L.L.C., Sheboygan, WI (US)

( * ) Notice: Subject to any disclaimer, the term of this patent is extended or adjusted under 35 U.S.C. 154(b) by 197 days.

(21) Appl. No.: 12/287,532

(22) Filed: Oct. 10, 2008

(65) Prior Publication Data
US 2009/0114662 A1 May 7, 2009

Related U.S. Application Data

(60) Provisional application No. 60/998,349, filed on Oct. 10, 2007.

(51) Int. Cl.
*A47J 27/00* (2006.01)
*A47J 36/00* (2006.01)
*A47J 37/01* (2006.01)
(52) U.S. Cl. .................. 220/573.1; 220/573.2; 220/912
(58) Field of Classification Search .............. 220/573.1, 220/573.2, 912
See application file for complete search history.

(56) References Cited

U.S. PATENT DOCUMENTS

| | | | |
|---|---|---|---|
| 1,970,723 A | 8/1934 | Wolfe | 53/1 |
| 4,413,767 A * | 11/1983 | Hellinger | 228/136 |
| 5,752,305 A | 5/1998 | Cotterill et al. | 29/432.2 |
| 6,325,584 B1 * | 12/2001 | Marko et al. | 411/501 |
| 6,920,820 B2 | 7/2005 | Meggison et al. | 99/422 |
| 7,490,732 B2 * | 2/2009 | Wasserman et al. | 220/753 |
| 2008/0308561 A1 * | 12/2008 | Cheng et al. | 220/573.2 |

OTHER PUBLICATIONS

International Search Report dated Dec. 11, 2008 issued in the corresponding International Application No. PCT/US2008/011737.

* cited by examiner

*Primary Examiner* — Harry Grosso
(74) *Attorney, Agent, or Firm* — Foley & Lardner LLP (57) ABSTRACT

A cooking apparatus includes a cooking surface and a wall depending from the cooking surface. The wall has an interior surface and an exterior surface opposite the interior surface. A handle is adjacent the exterior surface. The handle has a first surface adjacent the wall and a second surface opposite the first surface. A rivet is disposed through the interior surface, the exterior surface, and the first surface of the handle. The second surface of the handle is unpierced by the rivet. The rivet is bonded with a mating material.

22 Claims, 13 Drawing Sheets

METHOD AND APPARATUS FOR ATTACHING A HANDLE USING SELF PIERCING RIVETS

CROSS-REFERENCE TO RELATED APPLICATIONS

This application claims the benefit of U.S. Provisional Application No. 60/998,349, filed Oct. 10, 2007, the contents of which are incorporated by reference herein.

BACKGROUND OF THE INVENTION

1. Field of the Invention

This disclosure relates generally to cookware and, more particularly, to a method and apparatus for attaching a handle using self piercing rivets.

2. Description of the Related Art

Cooking apparatus or cookware typically includes a bottom wall and a depending sidewall that is attached to a handle. The bottom wall and sidewall are adapted to receive the food to be cooked. Heat can be conducted through the bottom wall and sidewall from a heat source, such as a stove or oven, to cook the food therein. The handle allows the user to move the cookware. The material of the handle may also allow the user to move the cookware when the cookware is in communication with the heat source.

The handle and sidewall made of dissimilar metals has presented challenges in connecting the handle to the sidewall in an easy to clean, inexpensive, secure manner. Methods of connecting the handle and sidewall typically require holes to be formed in a handle and sidewall prior to manually inserting a mechanical fastener that result in portions that protrude through the sidewall into the cooking area, which can form areas that trap food particles and/or are difficult to clean. Other methods of securing the handle to the sidewall such as welding typically require holes to be formed at least in a handle and can require an undesirably high amount of labor and cost and disassembly of the connection between the handle and sidewall to ensure a secure connection.

Accordingly, it has been determined by the present disclosure there is a need for a cookware that overcomes, alleviates, and/or mitigates one or more of the aforementioned and other deleterious effects of the prior art.

SUMMARY OF THE INVENTION

A cooking apparatus is provided that includes a cooking surface and a wall depending from the cooking surface. The wall has an interior surface and an exterior surface opposite the interior surface. A handle is adjacent the exterior surface. The handle has a first surface adjacent the wall and a second surface opposite the first surface. A rivet is disposed through the interior surface, the exterior surface, and the first surface of the handle. The second surface of the handle is unpierced by the rivet. The rivet is bonded with a mating material.

A method is also provided that includes placing a handle adjacent a first side of a wall of cookware, placing a rivet adjacent a second side of the wall opposite of the first side, applying a force to move the rivet through the wall and into the handle without piercing through the handle, and molding the rivet and a mating material to form a bond with the handle securing the handle to the wall.

The above-described and other features and advantages of the present disclosure will be appreciated and understood by those skilled in the art from the following detailed description and drawings.

DETAILED DESCRIPTION OF THE INVENTION

Figure 1:
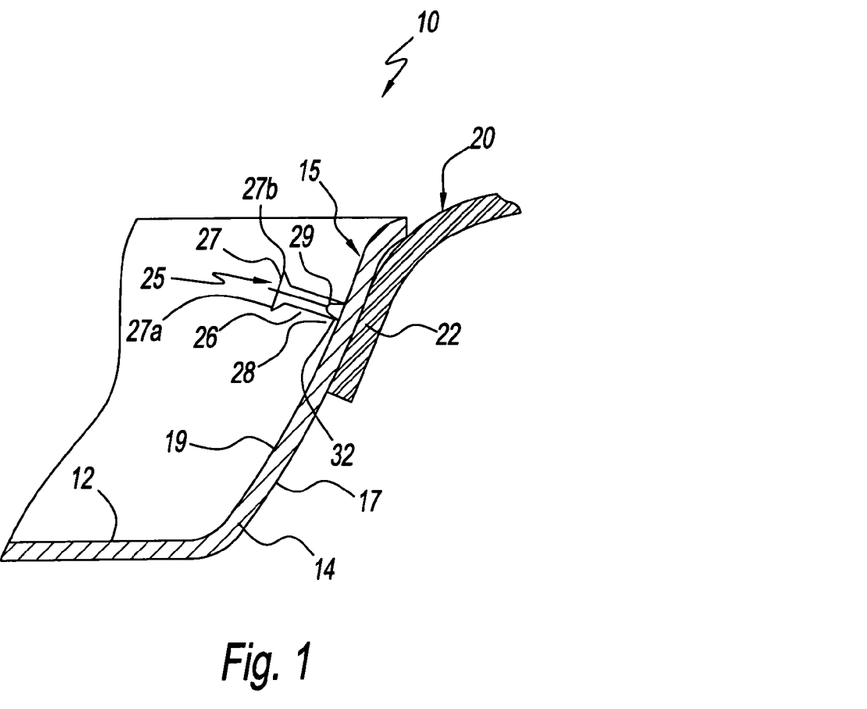
FIG. 1 is a partial side cross-sectional view of an exemplary rivet adjacent an interior side of cookware and a handle of the present disclosure.
Figure 2:
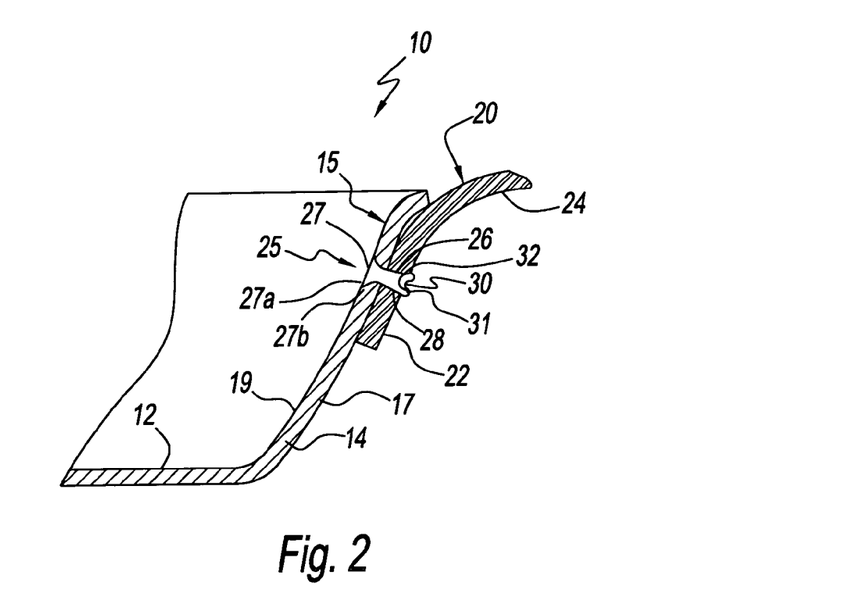
FIG. 2 is a partial side cross-sectional view of the exemplary rivet and cookware of FIG. 1 having the rivet through the cookware and into the handle.

Referring now to the figures and in particular to FIGS. 1 and 2, an exemplary embodiment of cookware generally referred to by reference numeral 10 is illustrated. Cookware 10 may be any type of cookware, such as, for example, a bake pan, fry pan, sauté pan, sauce pan, or stock pot. Cookware 10 may have a pan 15. As shown in FIGS. 1 and 2, pan 15 may have a cooking surface 12 and a wall 14 depending from cooking surface 12. Cookware 10 may be coated or uncoated aluminum cookware. Cookware 10 may be coated, such as, for example, with non-stick surface coatings, or anodization of metal. Cookware 10 may be any metal, for example, aluminum, steel, stainless steel, or laminated metal. Cookware 10 may have a circular or curved shape when viewed from above and have a curved sidewall when viewed from the side, as shown in FIGS. 1 and 2. Of course, it is contemplated by the present disclosure for cookware 10 to have any desired shape when viewed from above such as a circular shape, a polygonal shape, and combinations thereof. In addition, it is also contemplated by the present disclosure for cookware 10 to have wall 14 with any desired shape when viewed from the side such as a curved, linear, and combinations thereof.

A handle 20 is placed against an exterior side 17 of cookware 10. Handle 20 may be any metal, such as, for example, aluminum, steel, stainless steel, copper. Handle 20 may be the same material or different material than cookware 10. For example, handle 20 may have a saddle portion 22 and a gripping portion 24, as shown in FIGS. 1 and 2. Saddle portion 22 and gripping portion 24 may connect forming an angle that fits within a bent portion of wall 14.

As shown in FIG. 2, a self-piercing rivet 25 is through cookware 10 and through a portion of handle 20. Rivet 25 and mating material 30 are molded to form a bond. Mating material 30 is the material of the items to be joined together, such as, for example, aluminum, steel, stainless steel, and combinations thereof.

As shown in FIG. 1, rivet 25 is placed adjacent to a cooking area or an interior side 19 of cookware 10. Self-piercing rivet 25 has a shaft 26 having a head 27 on a first side and a piercing portion 28 on a second opposite side. Head 27 has a larger diameter than shaft 26. Piercing portion 28 may be of material that will pierce cookware 10 when force is applied thereto. Rivet 25 may have a cavity 29 therein. Cavity 29 may extend into piercing portion 28 and/or piercing portion 28 and shaft 26. Cavity 29 may have a cavity wall 32 that surrounds cavity 29.

As shown in FIG. 2, rivet 25 is forced through cookware 10 and into handle 20. Material of cookware 10 and/or cookware 10 and handle 20 are urged into cavity 29 of rivet 25 when rivet 25 is forced through cookware 10 and into handle 20 forming mating material 30. Air and hydraulic forces may force rivet 25 through cookware 10 and into handle 20. Rivet 25 and mating material 30 are molded to form a bond. A die may be used to mold rivet 25 and mating material 30 to form a bond with cookware 10. Rivet 25 is deformed and mating material 30 is also deformed to join both rivet 25 and mating material 30 together. Cavity wall 32 may be deformed and mating material 30 is also deformed to join both rivet 25 and mating material 30 together. Cavity wall 32 may be deformed outward so that material of handle surrounds cavity wall.

Head 27 of rivet 25 has a top portion 27a and a side surface 27b that connects top portion 27a to shaft 26. Top portion 27a is a substantially flat smooth surface. Top portion 27a is free of protrusions. Side surface 27b may be angled or tapered to have a decreasing width from top portion 27a to shaft 26. As shown in FIG. 1, head 27 is connected to pan 15 so that side surface 27b is within pan 15 and head 27 does not protrude and is substantially flush with interior side 19. Rivet 25 and pan 15 form a substantially smooth cooking area. It has been found by the present disclosure that head 27 that does not protrude and is substantially flush with interior side 19 provides a substantially smooth continuous cooking area that is free of depressions or protrusions, which will not trap food as in prior art cookware allowing easier cleaning making cookware more sanitary and reducing bacteria, in contrast to other rivets used in other riveting processes that include a head that protrudes into the cooking area of cookware and forms depressions or crevices that may collect food.

Figure 3:
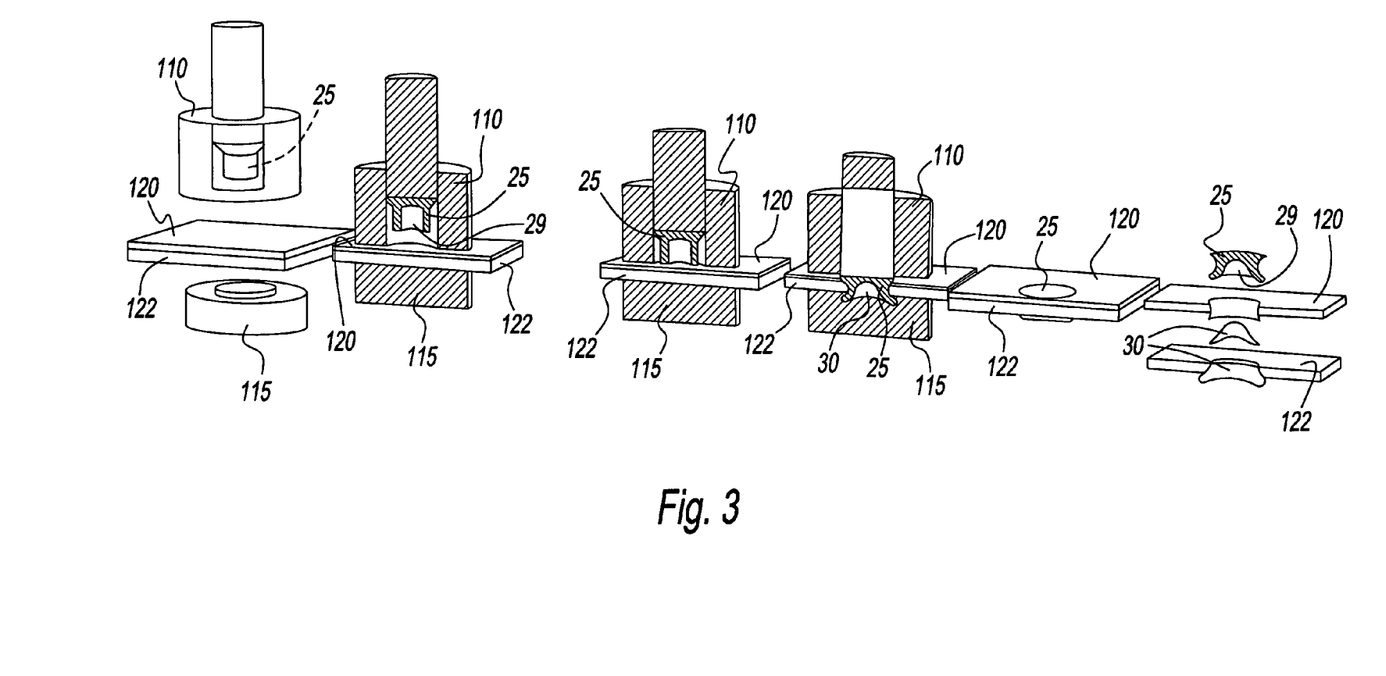
FIG. 3 is a schematic of steps of a self-piercing riveting process illustrating a front perspective view of a die, top sheet(s), bottom sheet, and a rivet prior to the self-piercing riveting process, side cross-sectional views of the die, top sheet(s), bottom sheet, rivet, and mating material during the self-piercing riveting process, a front perspective view of the top sheet(s), bottom sheet, rivet, and mating material resulting from the self-piercing riveting process, and an exploded side cross-sectional view of the top sheet(s), bottom sheet, rivet, and mating material resulting from the self-piercing riveting process.
Figure 4:
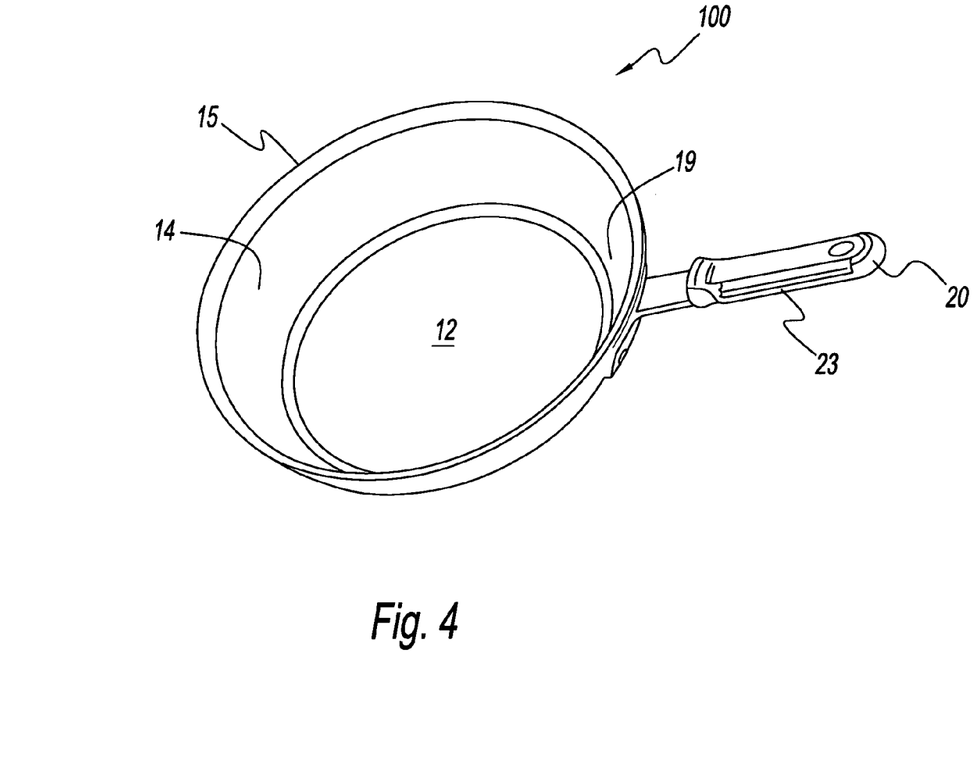
FIG. 4 is a top perspective view of exemplary cookware of the present disclosure.
Figure 5:
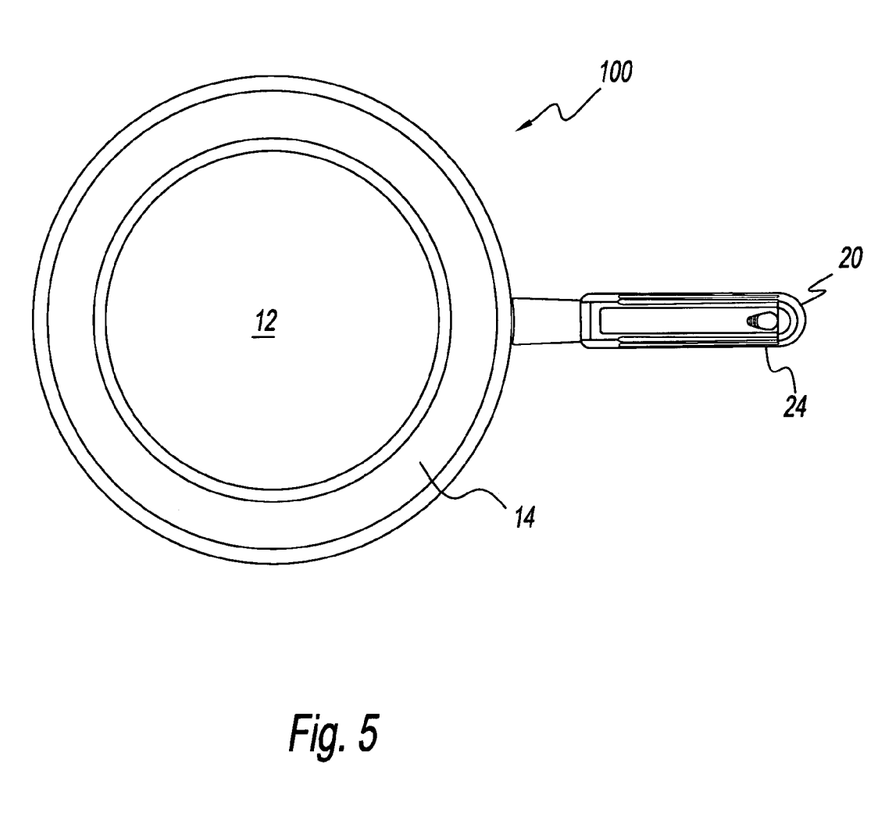
FIG. 5 is a top view of the cookware of FIG. 4.
Figure 6:
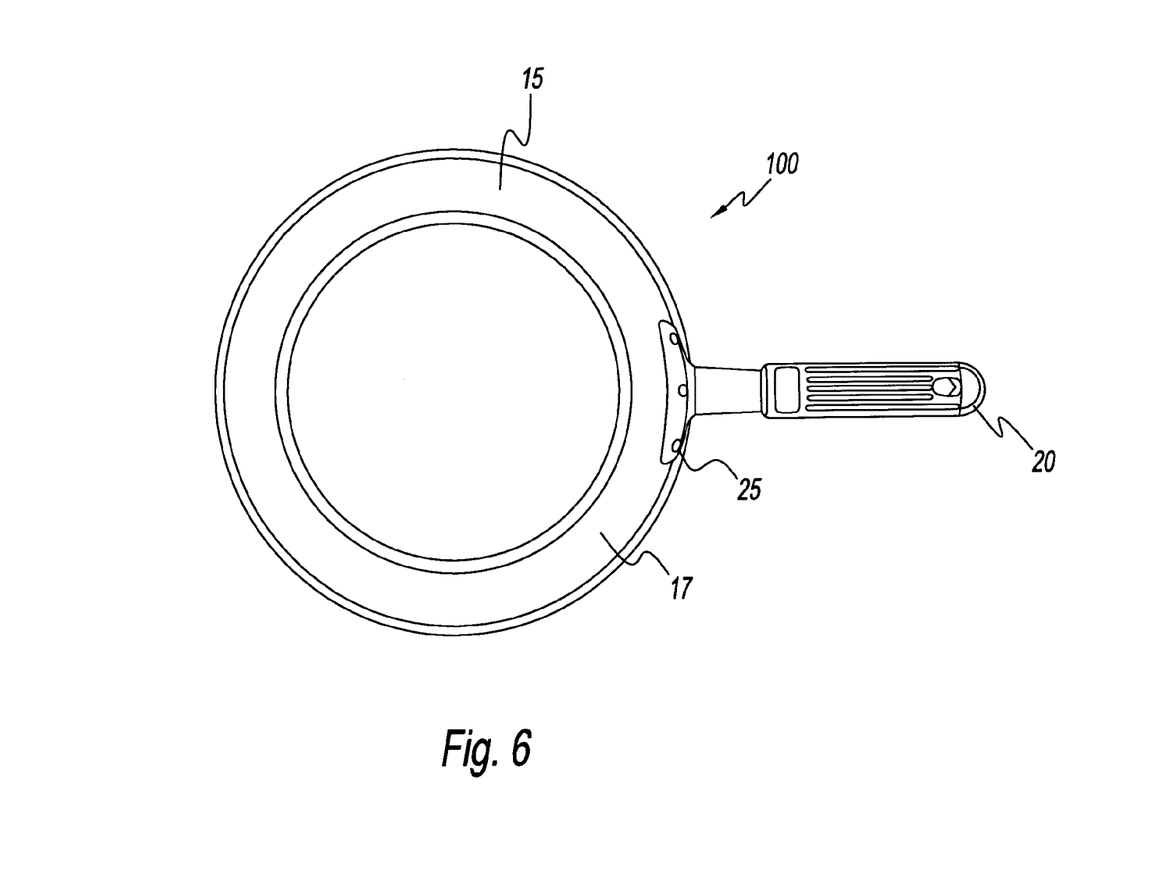
FIG. 6 is a bottom view of the cookware of FIG. 4.
Figure 7:
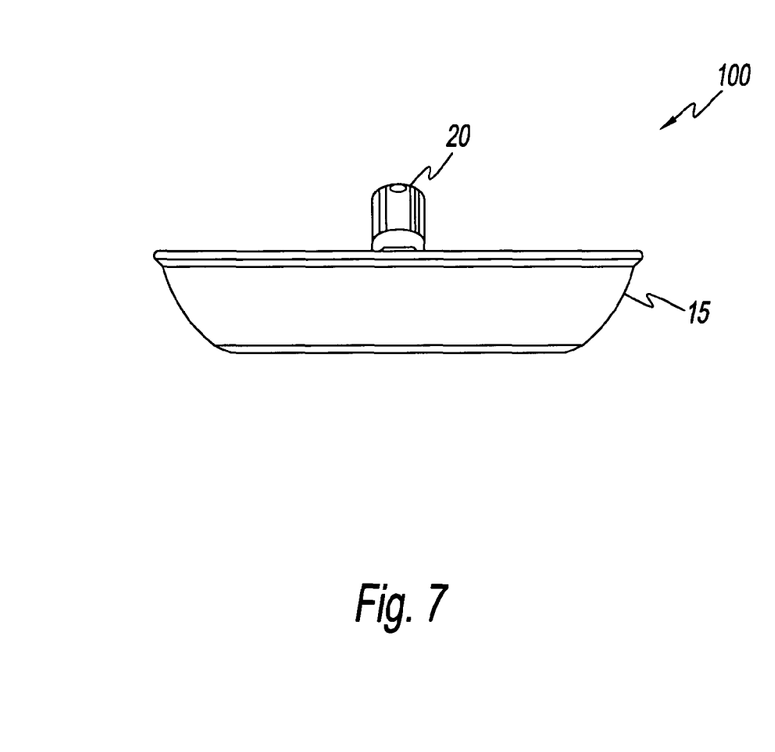
FIG. 7 is a front view of the cookware of FIG. 4.
Figure 8:
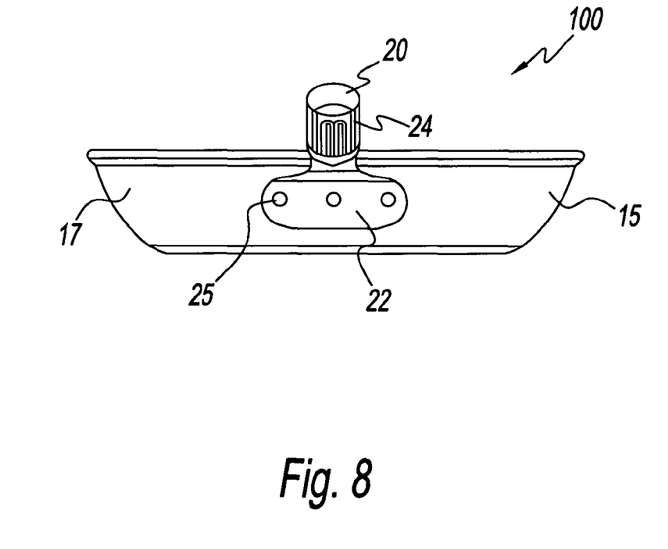
FIG. 8 is a rear view of the cookware of FIG. 4.
Figure 9:
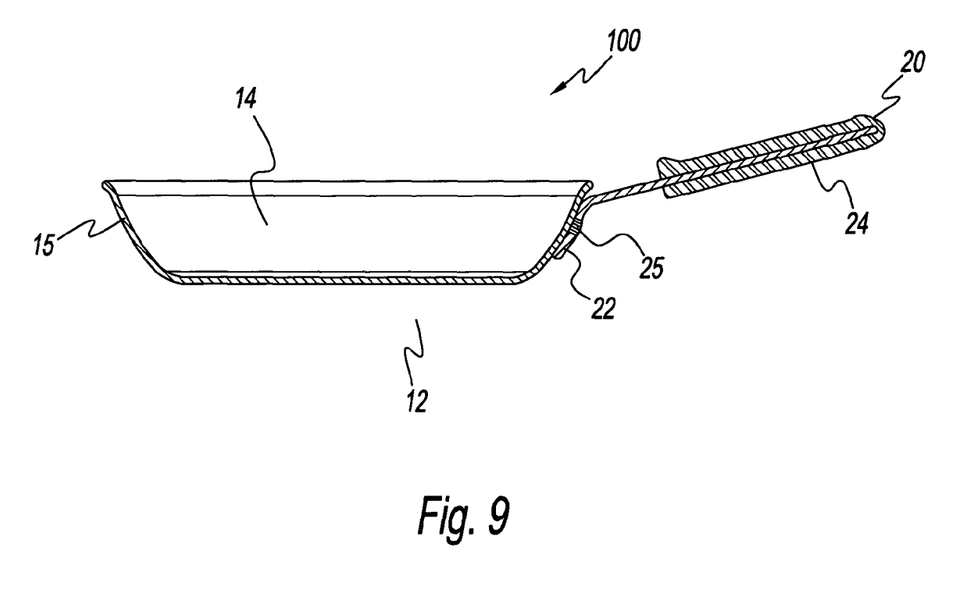
FIG. 9 is a side cross-sectional view of the cookware of FIG. 4.
Figure 10:
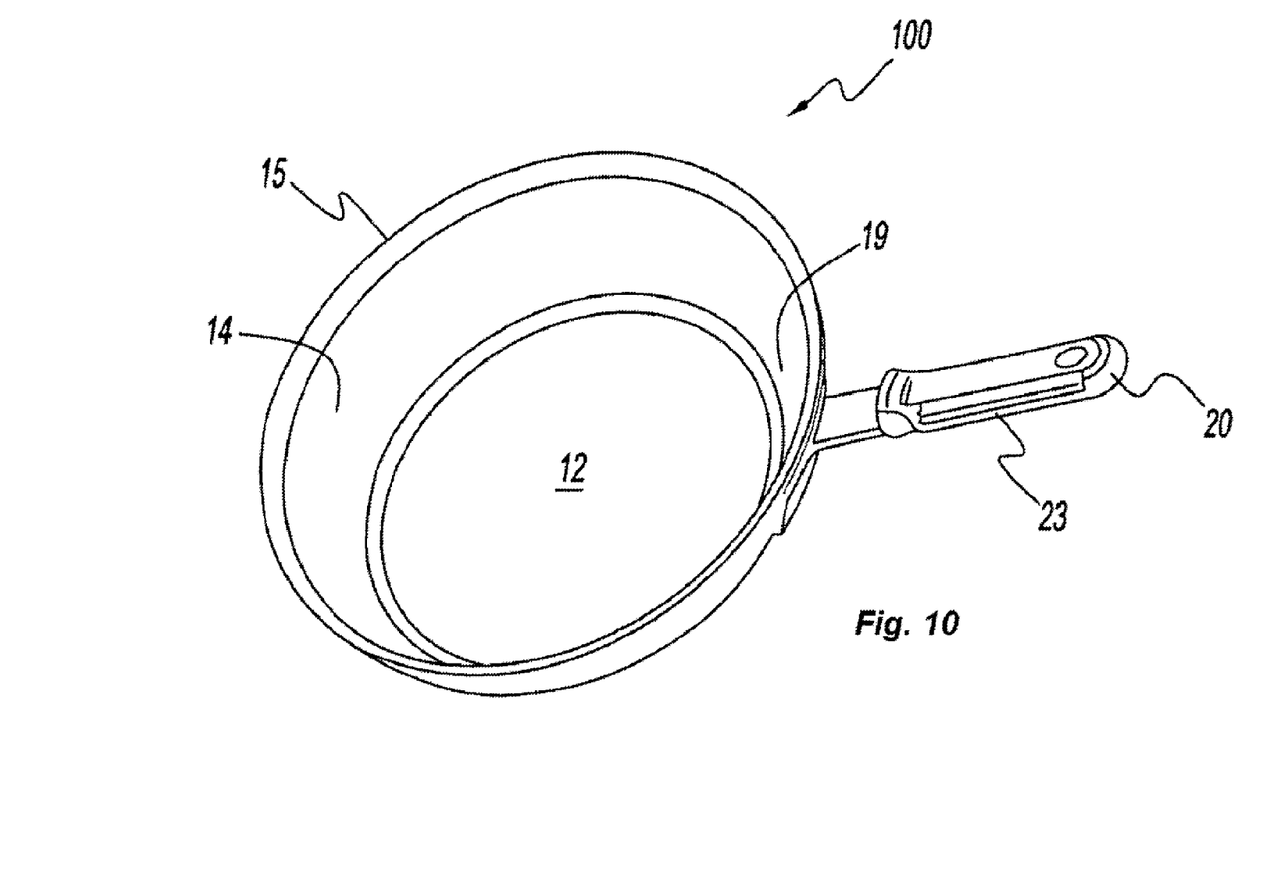
FIG. 10 is a top perspective view of another exemplary cookware of the present disclosure.
Figure 11:
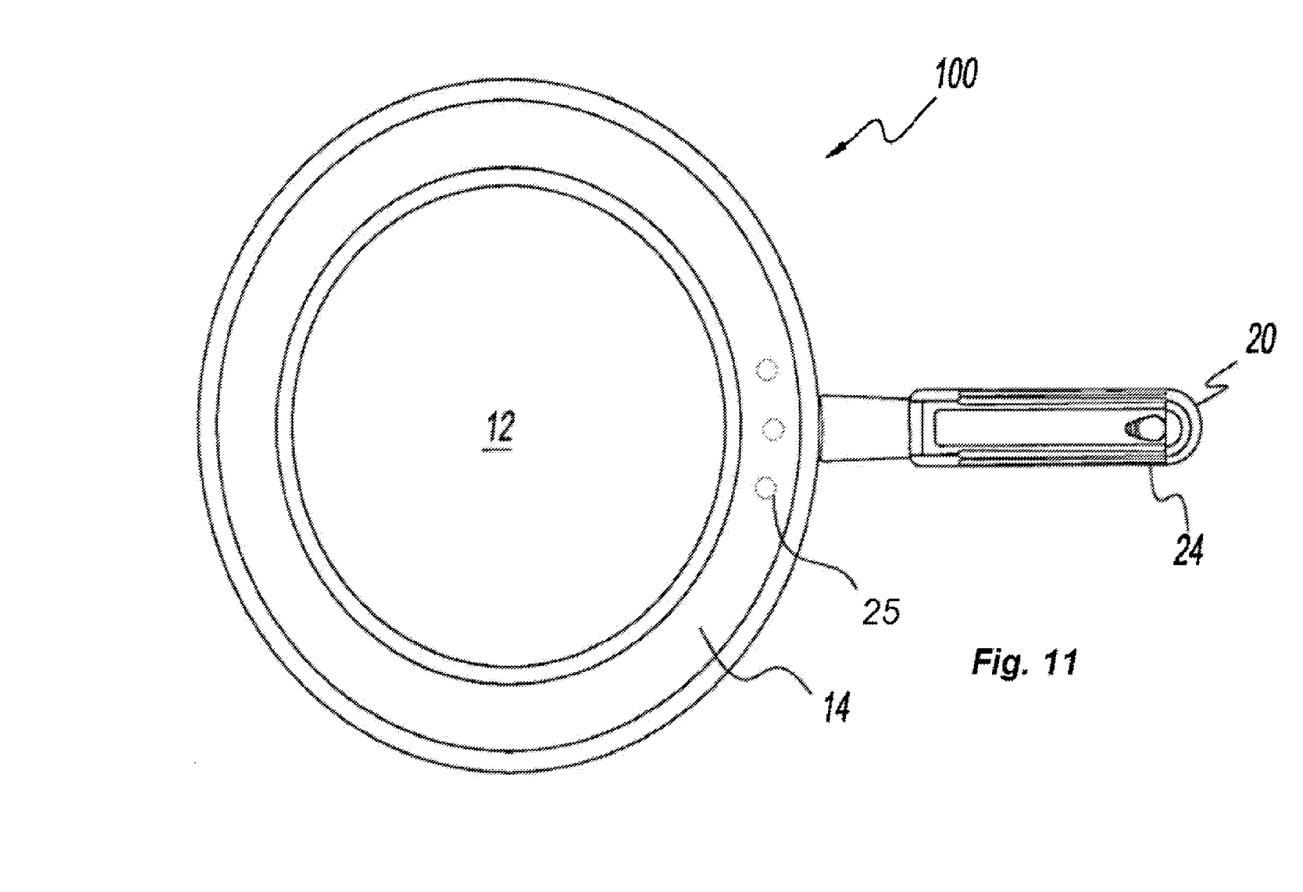
FIG. 11 is a top view of the cookware of FIG. 10 with rivets shown in broken lines.
Figure 12:
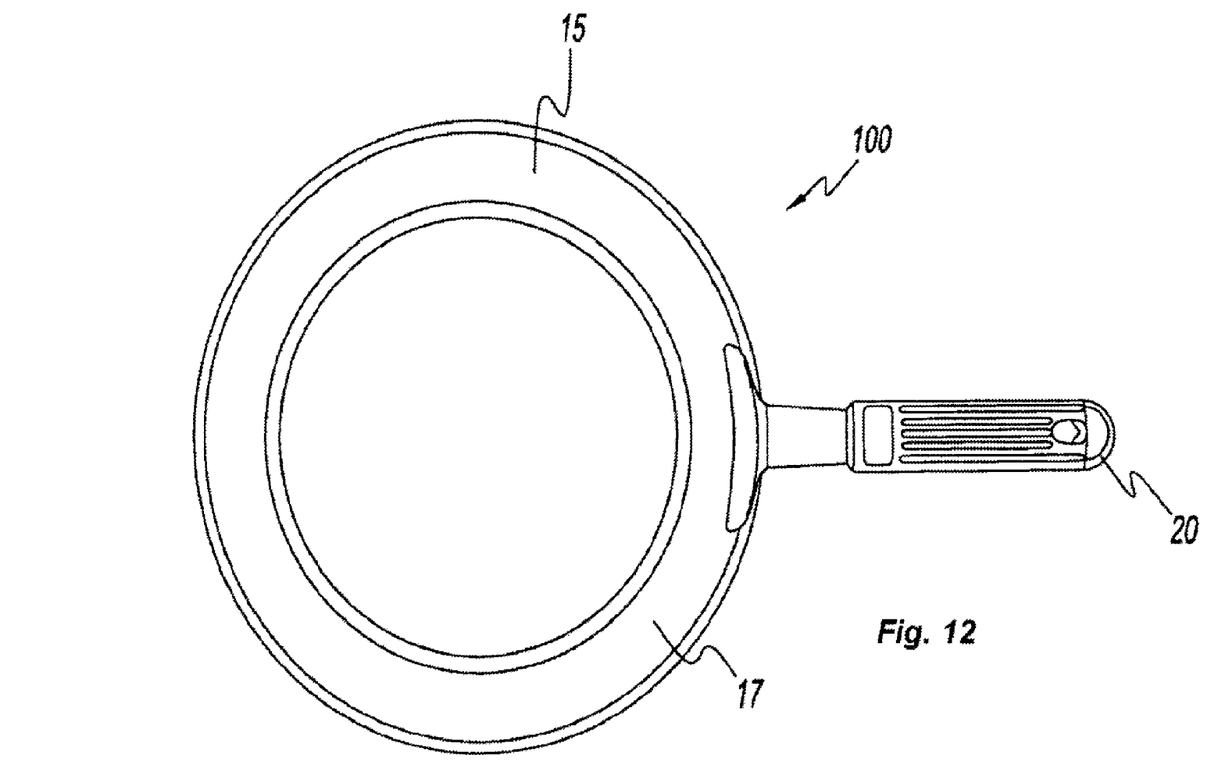
FIG. 12 is a bottom view of the cookware of FIG. 10.
Figure 13:
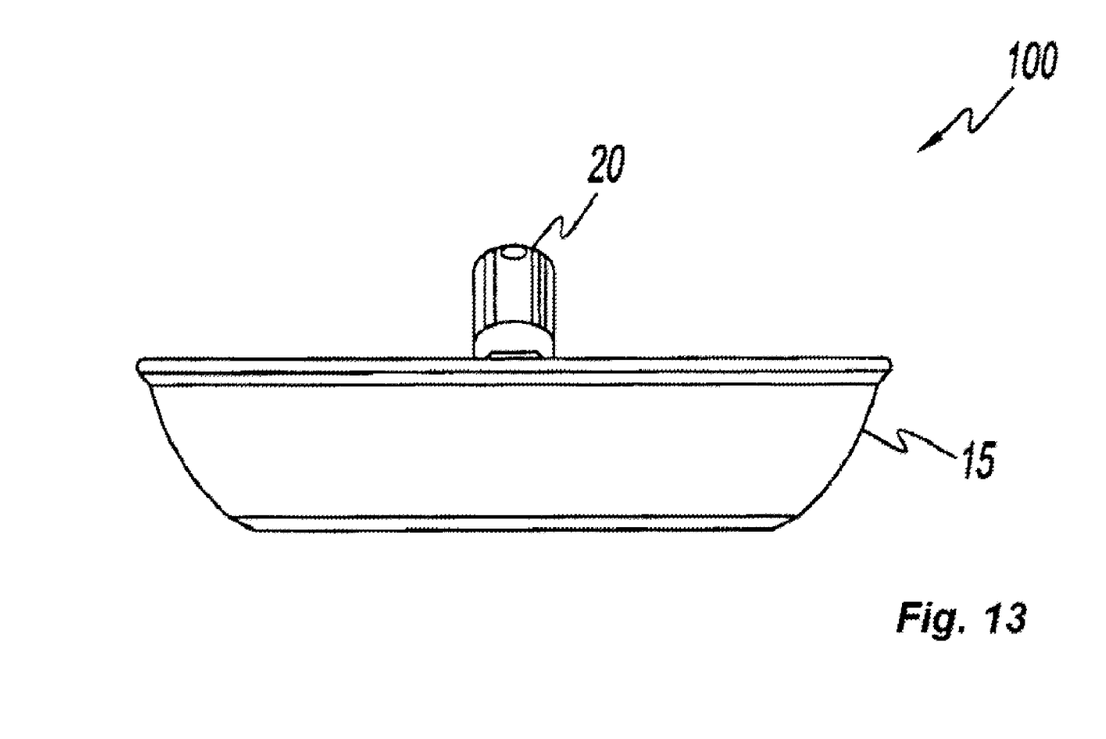
FIG. 13 is a front view of the cookware of FIG. 10.
Figure 14:
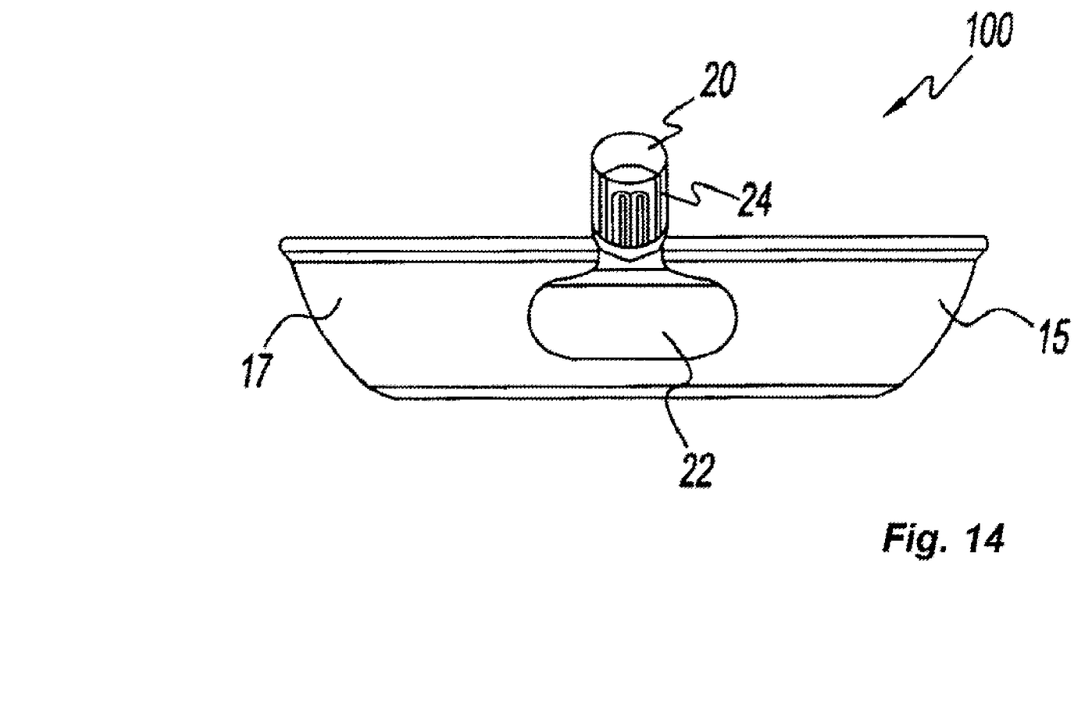
FIG. 14 is a rear view of the cookware of FIG. 10.

Referring now to FIG. 3, rivet 25 may be forced through cookware 10 and into handle 20 by self-pierce riveting (HSPR). Self-piercing riveting is a cold joining process used to fasten two or more sheets of material by driving a rivet through top sheet(s) and upsetting a rivet, under the influence of a die, into a lower sheet without piercing it. A die 110 is positioned on top and an anvil 115 is on a bottom of top sheet(s) 120 and a lower sheet 122. Rivet 25 is placed in die 110. Die 110 applies a force to rivet 25 to force rivet 25 through top sheet(s) 120 and into lower sheet 122 without piercing lower sheet 122. Rivet 25 is upset or molded with mating material 30 formed of material from top sheet(s) that rivet pierced through and lower sheet 122 forming a bond. Top sheet(s) 110 may be cookware 10 and lower sheet 122 may be handle 20.

It has been found by the present disclosure that die 110 may be formed to upset or mold rivet 25 with mating material 30 so that a side 31 of mating material 30 opposite rivet 25 is free from dimples or depressions. Advantageously, die 110 forming mating material 30 that is free of depressions or dimples forms a smoother surface on cookware than other riveting processes, which desirably creates a smoother more aesthetically pleasing surface that may be easier to clean.

Cookware 10 is complete after handle 20 is connected or cookware 10 may be coated. Rivet 25 may be any material such as metal. In some embodiments, the rivet may include zinc. Predetermined standards, such as, for example, standards provided by the National Sanitation Foundation require that zinc does not leach into food. In such cases, a coating may be applied to cookware 10, such as, for example, electroless nickel coating sold under the name Elnick 101 manufactured by MacDermid of Waterbury, Conn.

Two of rivets 25 may be used to secure handle 20 to cookware 10 and prevent rotation of handle 20. Any number of rivets 25 may be used to increase a safety factor or appearance in a joint or connection between handle 20 and cookware 10. The size, shape and number of rivets 25, as well as pan 15 or cookware 10, can vary with the particular needs of cookware 10. Such factors as sizing, material properties, hardness, mobility, aesthetics, heating needs, cookware capacity, and others can be used by one of ordinary skill in the art to determine the particular size, shape and number of rivets 25, as well as their configuration in cookware 10. Rivet 25 is sized so that head 27 does not protrude and is substantially flush with pan 15. Rivet 25 may be a length that is smaller than a determined size so that die 110 and/or rivet 25 does not break when die 110 applies the force to rivet 25. Rivet 25 may be a length that is substantially equal to or slightly greater than a width of pan 15 and handle 20.

FIGS. 4 through 9 show exemplary cookware 100. Cookware 100 is similar to cookware 10, but includes gripping portion 24 having a gripper 23, saddle portion 22 that is sized to be secured to exterior side 17 by three rivets 25 instead of one, as shown in FIGS. 1 and 2, and gripping portion 24 and saddle portion 22 are connected so that they do not abut a bent portion of wall 14. Cookware 100 is substantially circular and may have a coating on interior side 19 over rivets 25 to form a smooth cooking area free of protrusions as previously described herein.

The method and apparatus for attaching a handle using self piercing rivets will exhibit at least substantially the same strength characteristics or greater strength characteristics as prior art methods. Cookware 10 having handle 20 has a substantially smooth cooking area, which will not trap food as in prior art cookware allowing cookware to be more sanitary and easier to clean. Thus, cookware 10 and method of the present disclosure can comply with predetermined standards for consumer health and safety, such as, for example, standards of the National Sanitation Foundation. Cookware 10 having handle 20 connects the handle and wall 14 without requiring holes to be formed in the handle and/or wall prior to inserting rivet 25. Further, cookware 10 reduces an amount of labor and cost, and does not require disassembly of the connection of rivet 25 in cookware 10 to ensure a secure connection in contrast to prior art methods of attaching a handle.

Rivet 25 may be used to connect other portions of cookware similar to connecting handle 20 and wall 14 where a continuous smooth surface is desired, such as, for example, straps that extend under pan 15.

It should also be noted that the terms "first", "second", "third", "upper", "lower", and the like may be used herein to modify various elements. These modifiers do not imply a spatial, sequential, or hierarchical order to the modified elements unless specifically stated.

While the instant disclosure has been described with reference to one or more exemplary embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this invention, but that the invention will include all embodiments falling within the scope of the application.

What is claimed is:

1. A cooking apparatus comprising:
    a cooking surface;
    a wall depending from said cooking surface, said wall having an interior surface and an exterior surface opposite said interior surface;
    a handle adjacent said exterior surface, said handle having a first surface adjacent said wall and a second surface opposite said first surface;
    a rivet that is disposed through the interior and exterior surfaces of the wall and the first surface of the handle, wherein the second surface of the handle is unpierced by said rivet, and said rivet being bonded with a mating material; and
    wherein the second surface of the handle is free from dimples or depressions.

2. The cooking apparatus of claim 1, wherein said rivet has a shaft with a head on a first side and a piercing portion on a second opposite side within the handle.

3. The cooking apparatus of claim 2, wherein said piercing portion has a cavity that extends into said piercing portion toward said shaft and has an opening on an end opposite said head.

4. The cooking apparatus of claim 2, wherein said mating material comprises a material of said wall and a material of said handle.

5. The cooking apparatus of claim 3, wherein said piercing portion has a cavity wall that surrounds said cavity, and wherein said cavity wall and said mating material are molded together.

6. The cooking apparatus of claim 5, wherein said cavity wall is deformed outward and said material of the handle surrounds said cavity wall.

7. The cooking apparatus of claim 1, wherein the second surface of the handle is a saddle portion of the handle.

8. A method comprising:
    placing a first surface of a handle adjacent to an exterior side of a wall of cookware, wherein the handle further comprises a second surface opposite to the first surface, and wherein the wall further comprises an interior side opposite to the exterior side;
    placing a rivet adjacent the interior side of the wall;
    applying a force to move said rivet through the wall and into said handle without piercing through the handle;
    molding said rivet and a mating material to form a bond with the wall securing said handle to said wall; and
    joining the rivet with the handle so that the second surface of the handle is free from dimples or depressions.

9. The method of claim 8, wherein said rivet has a shaft with a head on a first side and a piercing portion on a second opposite side, and wherein said placing said rivet adjacent the interior side of the wall comprises placing said piercing portion in contact with the interior side of the wall.

10. The method of claim 8, wherein the second surface of the handle is a saddle portion of the handle.

11. The method of claim 9, wherein said piercing portion has a cavity that extends into said piercing portion toward said shaft and has an opening on an end opposite said head that is adjacent to the interior side of the wall, and further comprising collecting material of the wall in said cavity when said rivet is moved through the wall.

12. The method of claim 11, wherein said piercing portion has a cavity wall that surrounds said cavity, and wherein said molding of said rivet and said mating material comprises deforming said cavity wall.

13. The method of claim 11, wherein said piercing portion has a cavity wall that surrounds said cavity, and wherein said molding of said rivet and said mating material comprises deforming said cavity wall outward.

14. The method of claim 11, wherein said piercing portion has a cavity wall that surrounds said cavity, and wherein said molding of said rivet and said mating material comprises deforming said cavity wall and said mating material outward.

15. The method of claim 8, further comprising positioning said handle and said wall under a die and positioning said rivet inside of said die, and wherein said die applies said force to move said rivet through the wall.

16. The method of claim 8, further comprising coating said cookware.

17. A method comprising:
    fastening a top sheet of material to a bottom sheet of material to form a cooking apparatus by applying a force to a self-piercing rivet to drive the rivet through the top sheet and upset the rivet, under the influence of a die, into the bottom sheet without piercing through the bottom sheet;
    forming a bond by upsetting or molding the rivet with mating material formed of material from the top sheet and the bottom sheet; and
    joining the rivet and mating material so that a side of the mating material opposite the rivet is free from dimples or depressions.

18. The method of claim 17, wherein the side of the mating material opposite the rivet is exterior to a cooking area of the cooking apparatus.

19. The method of claim 18, wherein the wall and cooking surface are smooth.

20. The method of claim 19, wherein the cooking apparatus is at least one of a bake pan, fry pan, sauté pan, sauce pan, and stock pot.

21. The method of claim 17, wherein the top sheet comprises a wall that depends from a cooking surface of the cooking apparatus and the bottom sheet comprises a handle.

22. The method of claim 21, wherein the side of the mating material opposite the rivet that is free from dimples or depressions is a saddle portion of the handle.

* * * * *